(12) United States Patent
Katoh (10) Patent No.: US 7,664,524 B2
(45) Date of Patent: Feb. 16, 2010

(54) MOBILE COMMUNICATION SYSTEM, MOBILE COMMUNICATION TERMINAL CELL SEARCH METHOD AND PROGRAM FOR USE THEREWITH

(75) Inventor: Kenichi Katoh, Tokyo (JP)

(73) Assignee: NEC Corporation, Tokyo (JP)

( * ) Notice: Subject to any disclaimer, the term of this patent is extended or adjusted under 35 U.S.C. 154(b) by 778 days.

(21) Appl. No.: 11/049,424

(22) Filed: Feb. 2, 2005

(65) Prior Publication Data

US 2005/0239459 A1 Oct. 27, 2005

(30) Foreign Application Priority Data

Feb. 4, 2004 (JP) ............................. 2004-027431

(51) Int. Cl.
*H04B 7/00* (2006.01)

(52) U.S. Cl. .................. 455/525; 455/432.1; 455/456.1; 370/335

(58) Field of Classification Search ............... 455/432.1, 455/525, 456.1; 370/331, 335
See application file for complete search history.

(56) References Cited

U.S. PATENT DOCUMENTS 6,546,258 B1 * 4/2003 Nohara et al. ............ 455/456.1

2005/0239459 A1 * 10/2005 Katoh ..................... 455/432.1

FOREIGN PATENT DOCUMENTS

| JP | 2001-061176 | 3/2001 |
| JP | 2003-134569 | 5/2003 |
| JP | 2003-199137 | 7/2003 |
| JP | 2003-283371 | 10/2003 |

* cited by examiner

*Primary Examiner*—Nay A Maung
*Assistant Examiner*—Angelica M Perez
(74) *Attorney, Agent, or Firm*—Scully, Scott, Murphy & Presser, P.C.

(57) ABSTRACT

The invention provides a mobile communication terminal that allows the time for recognizing the scrambling code to be shortened.

The mobile communication terminal predicts the scrambling code to be searched at the next time by collating the previous result of GPS information process and the stored content of a position information database in a control part, if establishment of slot synchronization is completed employing a slot synchronization part. The control part acquires the information required for inverse spreading of the predicted scrambling code from a memory, and generates a code for inverse spreading. A predicted scrambling code recognition part inputs the code for inverse spreading shifted in a unit of slot from the control part, and attempts inverse spreading. The control part suspends a normal three-stage cell search that is performed in parallel with the cell search of the invention, if prediction from the position information is determined to be correct in the predicted scrambling code recognition part.

13 Claims, 7 Drawing Sheets

MOBILE COMMUNICATION SYSTEM, MOBILE COMMUNICATION TERMINAL CELL SEARCH METHOD AND PROGRAM FOR USE THEREWITH

BACKGROUND OF THE INVENTION

1. Field of the Invention

The present invention relates to a mobile communication system, a mobile communication terminal, a cell search method and a program for use therewith, and more particularly to a cell search method in a W-CDMA (Wideband-Code Division Multiple Access) mobile communication system.

2. Description of the Prior Art

An asynchronous W-CDMA communication system is one of the communication systems as defined in accordance with the IMT2000 (International Mobile Telecommunication-2000).

In this asynchronous system, a scrambling code is assigned to each cell, and a mobile communication terminal employs a cell search technique of three stages to detect a cell to which the self terminal belongs.

FIG. 7 shows the formats of synchronous channels used for the cell search. FIG. 7A shows one super-frame consisting of 72 frames, its period being 720 ms. FIG. 7B shows one frame consisting of fifteen slots, its period being 10 ms.

Figure 7A:
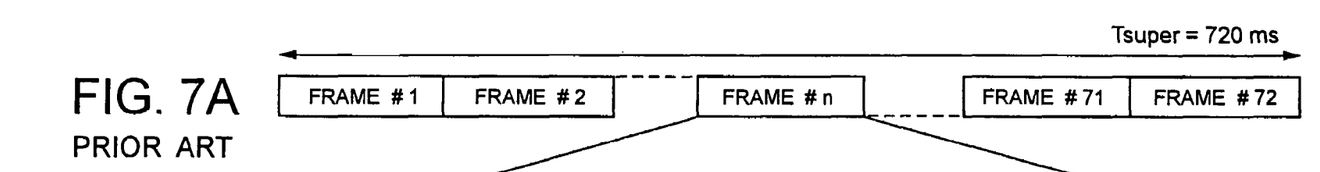
FIG. 7 is a diagram showing the formats of synchronous channels used for cell search.
Figure 7B:
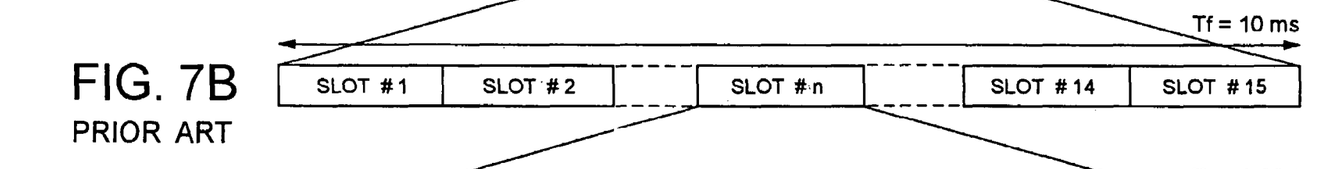
Figure 7C:
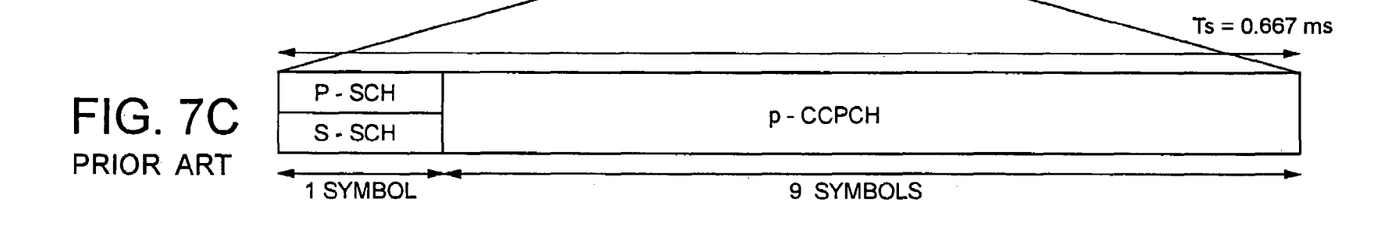

FIG. 7C shows p-CCPCH (primary-Common Control Physical Channel) of nine symbols, and one slot consisting of P-SCH (Primary-Synchronization Channel) and S-SCH (Secondary-Synchronization Channel) of one symbol, its period being 0.667 ms, and one symbol being composed of 256 chips.

Figure 7D:
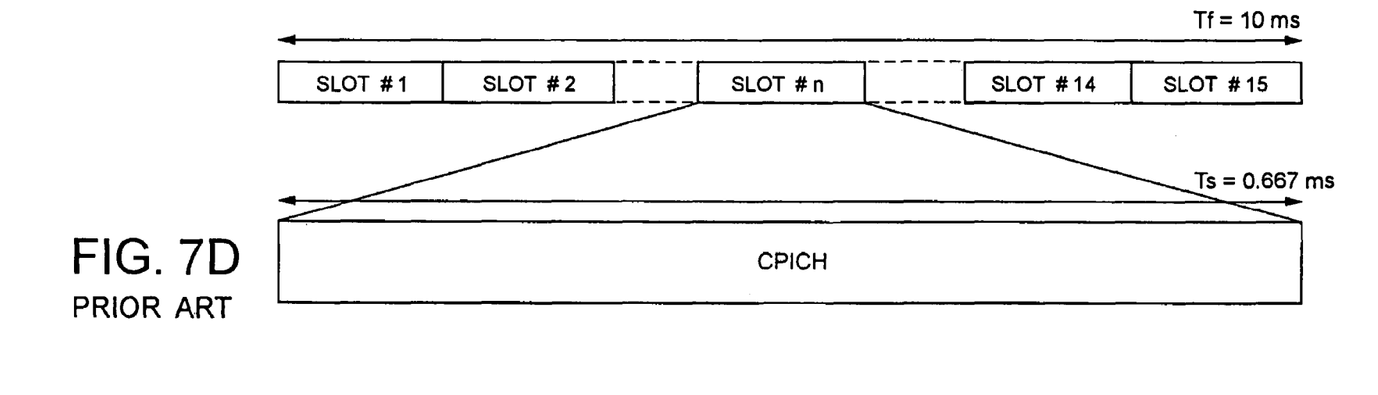

FIG. 7D shows CPICH (Common Pilot Channel) for use to recognize the scrambling code, its period being 0.667 ms.

There area total, of 512 kinds of scrambling codes assignable to the cell, which are divided into 64 kinds of code groups. Each code group has eight kinds of scrambling codes (64×8=512).

Figure 6:
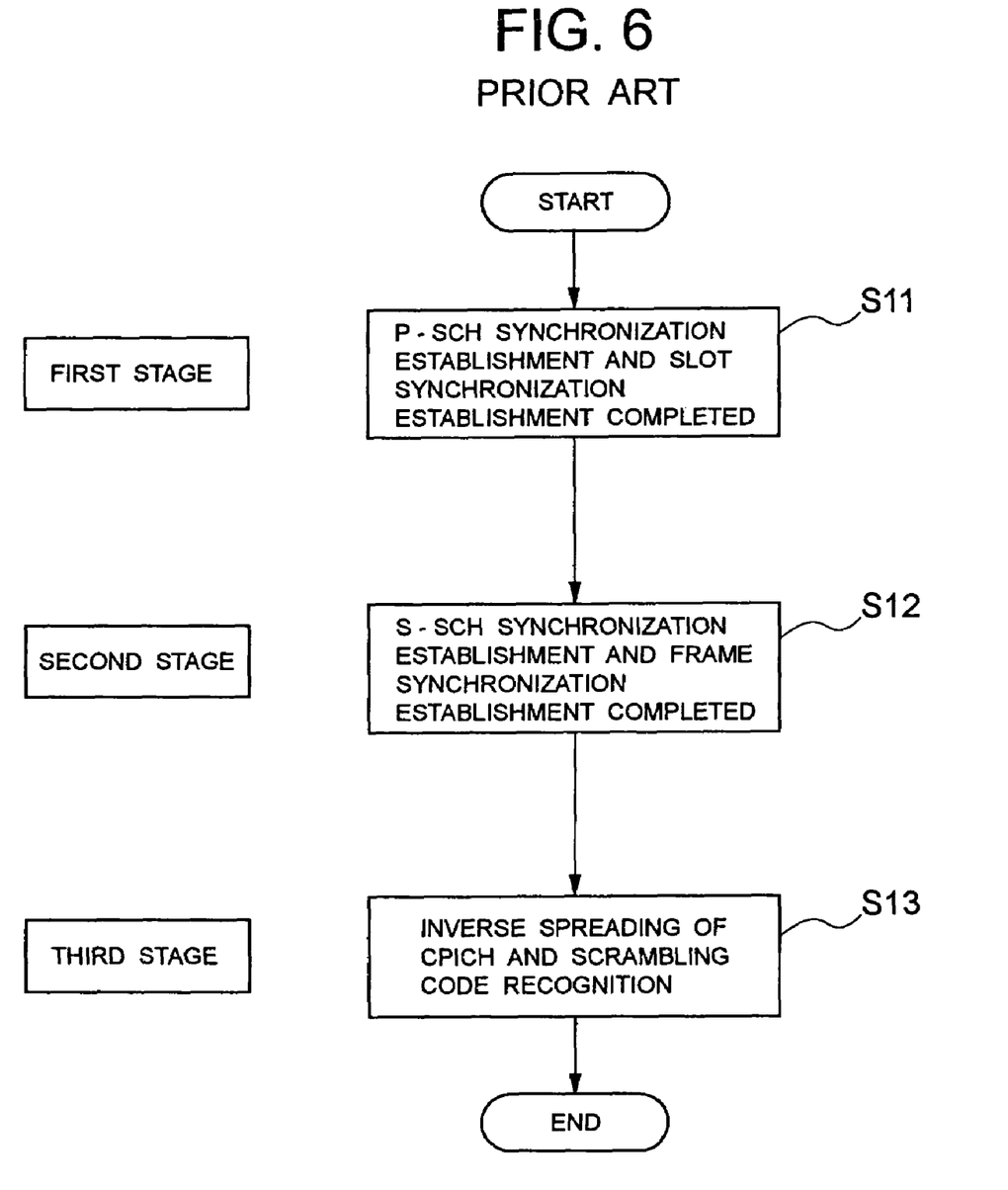
FIG. 6 is a flowchart showing a cell search operation in the conventional example.

To detect the cell to which the self terminal belongs, the mobile communication terminal makes the synchronization establishment of P-SCH at a first stage, as shown in FIG. 6. Since P-SCH has only one code that is predetermined for all the base stations, it detects the slot timing through inverse spreading using that code and makes the slot synchronization establishment (step S11 in FIG. 6).

A second stage involves making the synchronization establishment of S-SCH in accordance with a slot timing detected at the above-mentioned first stage. Since S-SCH has 16 kinds of code in a unit of slot, one code group being decided from 64 kinds of code groups in combinations thereof, inverse spreading is made round a total of 16 kinds of codes in accordance with the slot timing, detecting a frame timing, and making the frame synchronization establishment (step S12 in FIG. 6). This synchronization establishment requires inverse spreading of three slots (2 ms) at minimum, and 15 slots (10 ms) at maximum (e.g., refer to Patent Document 1).

A third stage involves making the inverse spreading for CPICH round eight scrambling codes belonging to the code group proved at the second stage in accordance with the frame timing detected at the second stage and recognizing the scrambling code assigned to the cell (step S13 in FIG. 6).

The details of the frame configuration, slot configuration, SCH, and scrambling code are arranged as the standard recommendation in 3GPP (Third Generation Partnership Project).

[Patent Document 1]

Japanese Patent Laid-Open No. 2003-283371

In the conventional cell search method, since the processes of the first stage (slot synchronization establishment), the second stage (frame synchronization establishment) and the third stage (scrambling code recognition) should be performed in due order, there is a problem that the cell search time is longer. Herein, the second stage requires a time of 2 ms at minimum and 10 ms at maximum.

However, if the cell search process is completed in a shorter time, there is a merit that the service time of battery for the mobile communication terminal is increased, and another process is performed for that time.

BRIEF SUMMARY OF THE INVENTION

Thus, the present invention has been achieved to solve the above-mentioned problems, and it is an object of the invention to provide a mobile communication system, a mobile communication terminal, a cell search method and its program for use therewith in which the time for recognition of the scrambling code is shortened.

The present invention provides a mobile communication system comprising a mobile communication terminal that detects a cell to which a self terminal belongs, based on a scrambling code assigned to each cell, the mobile communication terminal comprising means for acquiring the current position information of the self terminal, means for predicting the scrambling code, based on the acquired current position information, and means for determining whether or not the predicted scrambling code is correct, wherein the mobile communication terminal detects the cell to which the self terminal belongs, employing the scrambling code that is determined to be correct.

Also, the invention provides a mobile communication terminal that detects a cell to which a self terminal belongs, based on a scrambling code assigned to each cell, the mobile communication terminal comprising means for acquiring the current position information of the self terminal, means for predicting the scrambling code, based on the acquired current position information, and means for determining whether or not the predicted scrambling code is correct, wherein the mobile communication terminal detects the cell to which the self terminal belongs, employing the scrambling code that is determined to be correct.

Also, the invention provides a cell search method for use with a mobile communication system comprising a mobile communication terminal that detects a cell to which a self terminal belongs, based on a scrambling code assigned to each cell, the method comprising, on the side of the mobile communication terminal, a step of acquiring the current position information of the self terminal, a step of predicting the scrambling code, based on the acquired current position information, and a step of determining whether or not the predicted scrambling code is correct, wherein the mobile communication terminal detects the cell to which the self terminal belongs, employing the scrambling code that is determined to be correct.

Also, the invention provides a cell search program for use with a mobile communication system comprising a mobile communication terminal that detects a cell to which a self terminal belongs, based on a scrambling code assigned to each cell, the program enabling a computer to perform a step of acquiring the current position information of the self terminal, a step of predicting the scrambling code, based on the acquired current position information, and a step of determining whether or not the predicted scrambling code is correct, wherein the mobile, communication terminal detects the cell to which the self terminal belongs, employing the scrambling code that is determined to be correct.

That is, the mobile communication system of the invention measures the current position, based on the GPS (Global Positioning System) information, and predicts the scrambling code for use by referring to the past movement histories and the cell information at that time, when the mobile communication terminal performs a cell search on the W-CDMA (Wideband-code Division Multiple Access) mobile communication method. Consequently, the mobile communication system of the invention has a shorter cell search time than the conventional method.

Eventually, in the mobile communication system of the invention, the current position is measured based on the GPS information, the scrambling code is predicted by referring to the past movement histories and the cell information at that time, and inverse spreading is made by the predicted scrambling code, whereby it is unnecessary to perform the second stage (frame synchronization establishment) that is required with the conventional method and the cell search time is shorter than the conventional method.

The present invention achieves the effect that the time for recognizing the scrambling code is shortened by adopting the following constitution and operation.

DETAILED DESCRIPTION OF THE PREFERRED EMBODIMENTS

Figure 1:
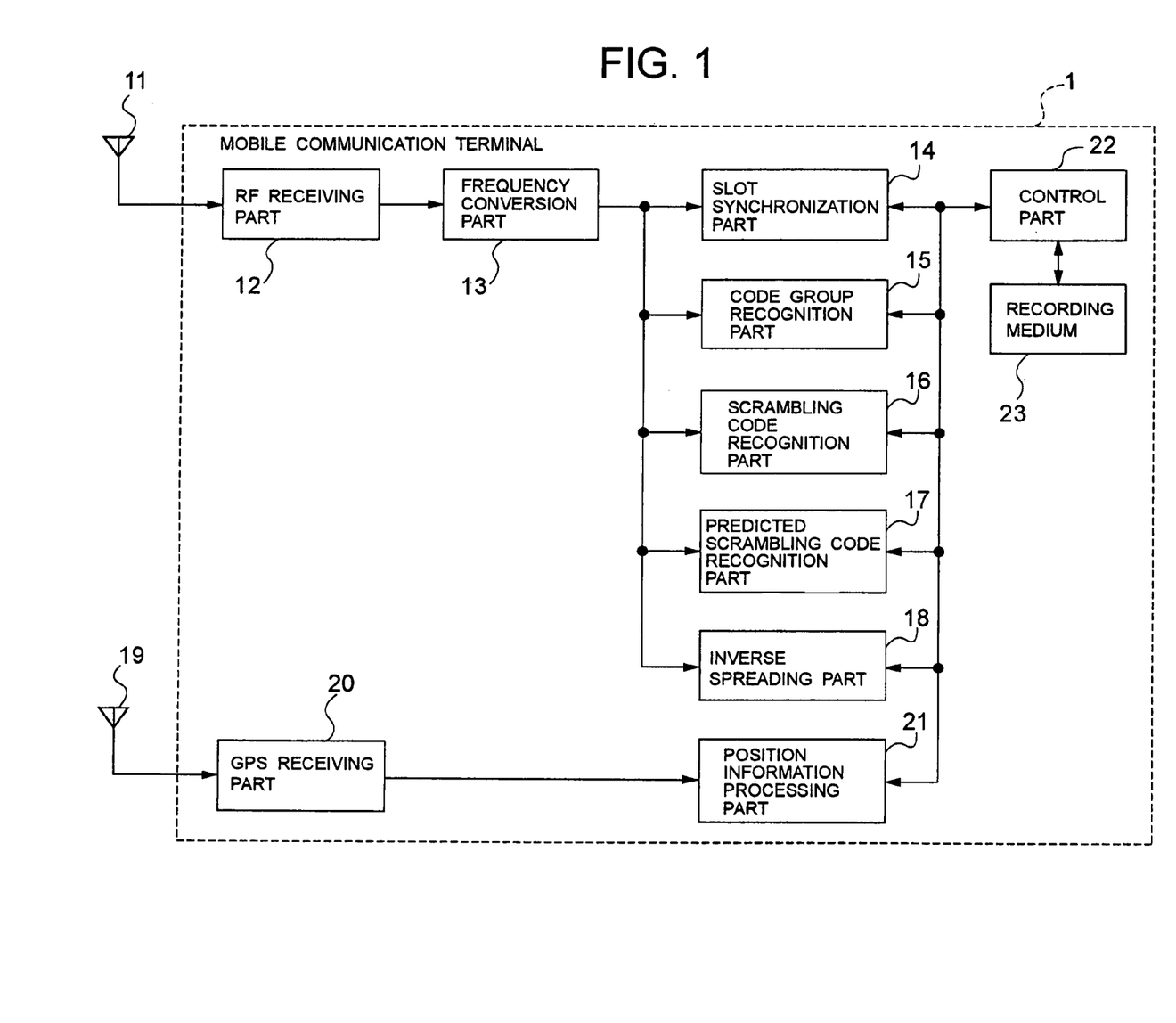
FIG. 1 is a block diagram showing the configuration of a mobile communication terminal according to one embodiment of the invention.

The preferred embodiments of the present invention will, be described below with reference to the accompanying drawings. FIG. 1 is a block diagram showing the configuration of a mobile communication terminal according to one embodiment of the invention. In FIG. 1, the mobile communication terminal 1 comprises an antenna 11, an RF (Radio Frequency) receiving part 12, a frequency conversion part 13, a slot synchronization part 14, a code group recognition part 15, a scrambling code recognition part 16, a predicted scrambling code recognition part 17, an inverse spreading part 18, a GPS (Global Positioning System) antenna 19, a GPS receiving part 20, a position information processing part 21, a control part 22, and a recording medium 23.

A W-CDMA (Wideband-Code Division Multiple Access) received signal from the antenna 11 is inputted via the RF receiving part 12 into the frequency conversion part 13, converted into a baseband signal by the frequency conversion part 13, and inputted into the slot synchronization part 14, the code group recognition part 15, the scrambling code recognition part 16, the predicted scrambling code recognition part 17, and the inverse spreading part 18.

The slot synchronization part 14 makes the slot synchronization establishment at the first stage of the conventional cell search method, the code group recognition part 15 makes the frame synchronization establishment at the second stage of the conventional cell search method as described above, and the scrambling code recognition part 16 makes the scrambling code recognition at the third stage of the conventional cell search.

The predicted scrambling code recognition part 17 recognizes whether or not the predicted scrambling code is correct, and the inverse spreading part 18 make the inverse spreading required for communication, as necessary.

A GPS received signal from the GPS antenna 19 is processed by the GPS receiving part 20 and inputted into the position information processing part 21. The position information processing part 21 notifies the position information.

The control part 22 controls each of the above blocks by executing a program (executable on the computer) stored in the storage medium 23, and controls the next stage by acquiring the synchronization establishment information from each of those blocks at each stage and the position information from the position information processing part 21.

The slot synchronization part 14 makes the inverse spreading, employing one code decided for P-SCH (Primary-Synchronization Channel) to establish the slot synchronization by a self correlation method, and notify its synchronous timing. Its operation, which is the same as in the conventional example, and well known, is not described here.

Figure 2:
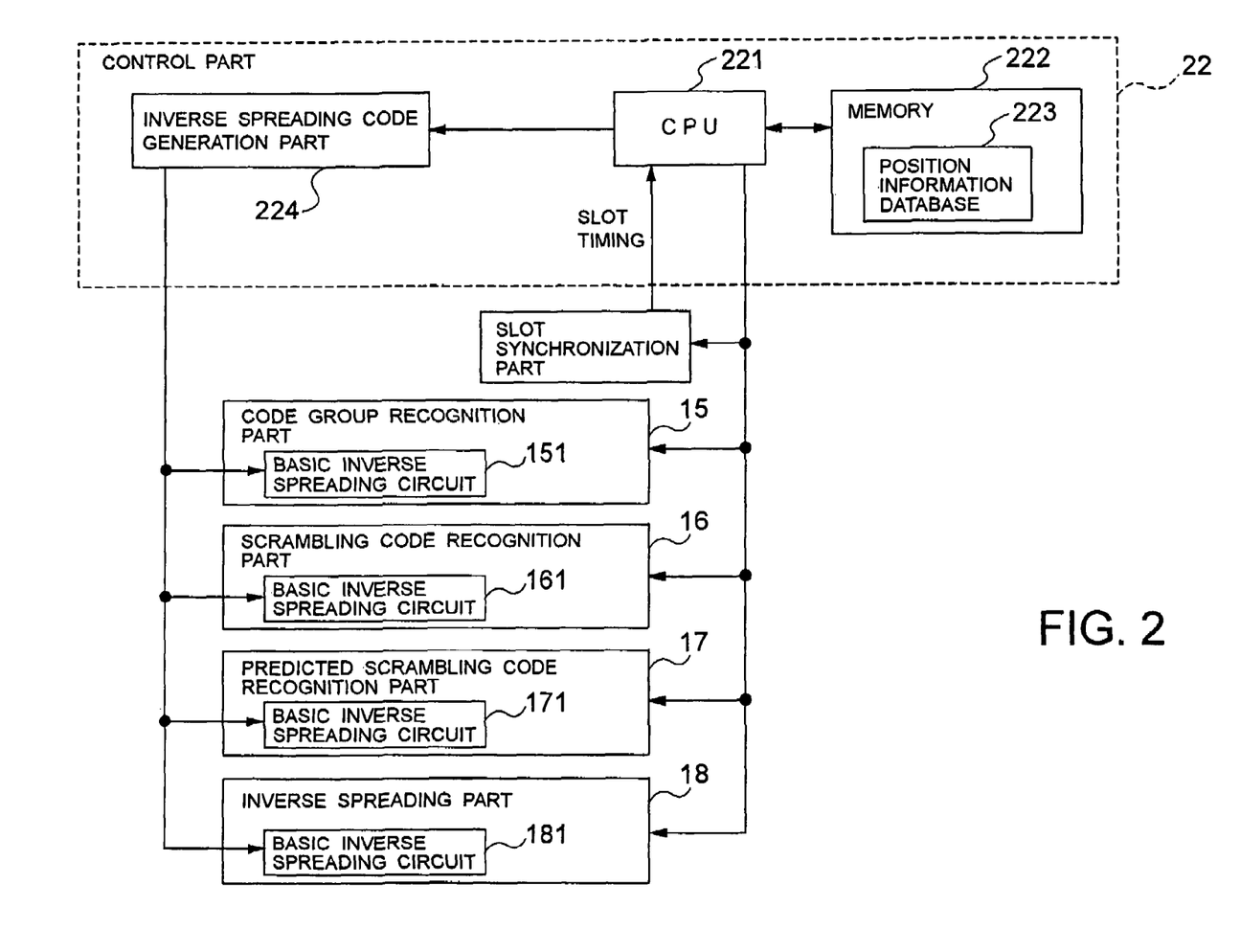
FIG. 2 is a block diagram showing a basic inverse spreading circuit and the controls of a control part in the mobile communication terminal of FIG. 1.
Figure 3:
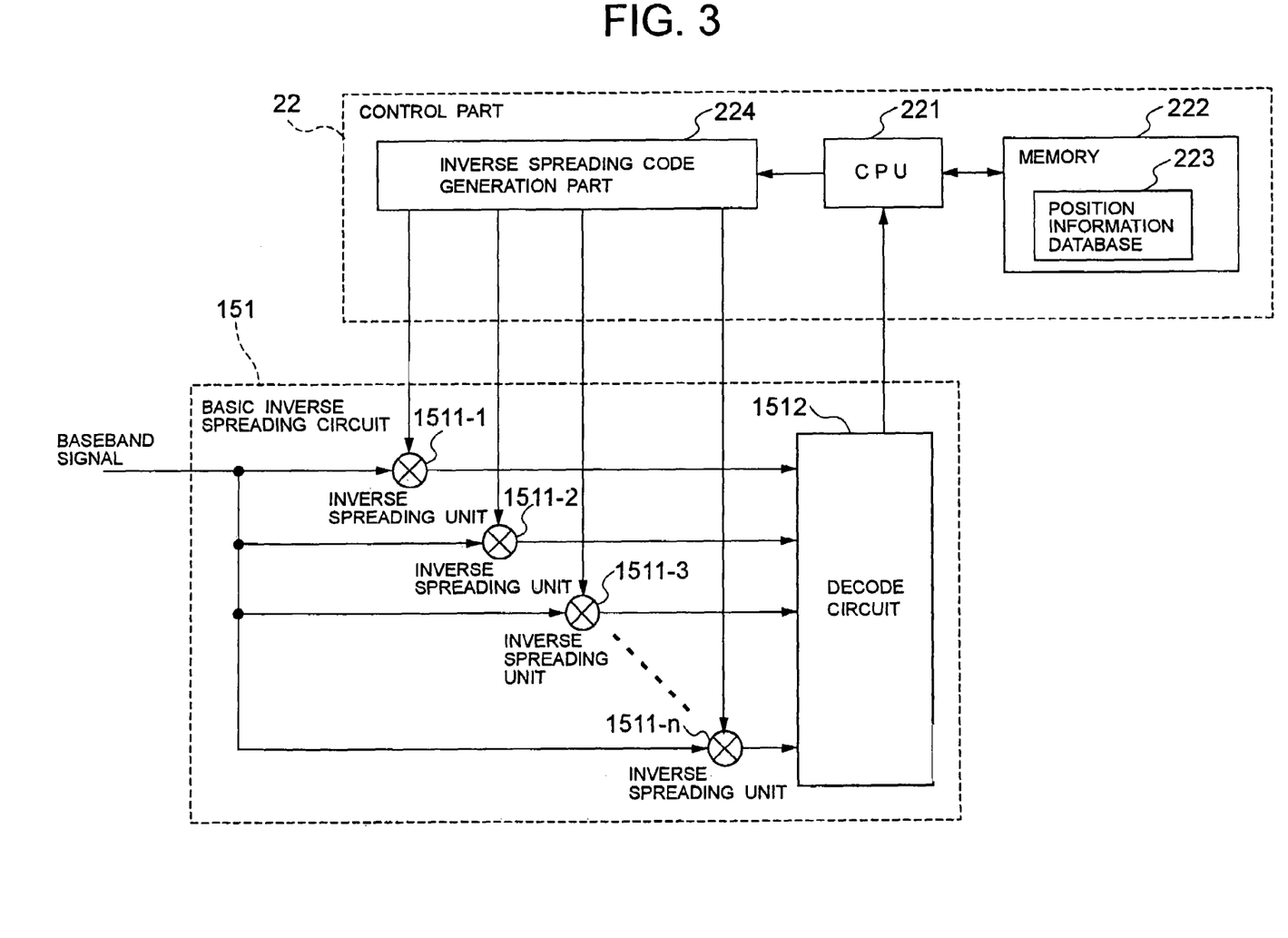
FIG. 3 is a block diagram showing a configuration example of the basic inverse spreading circuit in the mobile communication terminal of FIG. 1.

FIG. 2 is a block diagram showing a basic inverse spreading circuit and the controls of the control part 22 in the mobile communication terminal 1 of FIG. 1. FIG. 3 is a block diagram showing a configuration example of the basic inverse spreading circuit in the mobile communication terminal 1 of FIG. 1. In FIG. 2, there are illustrated the basic inverse spreading circuits 151, 161, 171 and 181 for making the inverse spreading of a baseband signal in the code group recognition part 15, the scrambling code recognition part 16, the predicted scrambling code recognition part 17 and the inverse spreading part 18, and the controls of the control part 22.

A CPU (Central Processing Unit) 221 within the control part 22 inputs or outputs a control signal for controlling the slot synchronization part 14, the code group recognition part 15, the scrambling code recognition part 16, and the predicted scrambling code recognition part 17, and receives a slot timing from the slot synchronization part 14.

Also, the CPU 221 reads or writes a position information database 223 stored in a memory 222 or the necessary information for inverse spreading upon occasion, and passes the information to an inverse spreading code generation part 224. The inverse spreading code generation part 224 generates an inverse spreading code, and outputs the generated code to each of the basic inverse spreading circuits 151, 161, 171 and 181.

The basic inverse spreading circuit 151 is composed of the inverse spreading units 1511-1 to 1511-n, and a decode circuit 1512, as shown in FIG. 3. Each of the basic inverse spreading circuits 161, 171 and 181 has the same constitution as the above-mentioned basic inverse spreading circuit 151.

The code generated by the above-mentioned inverse spreading code generation part 224 is subjected to inverse spreading with the baseband signal by the inverse spreading units 1511-1 to 1511-*n* in the basic inverse spreading circuit 151. A signal after inverse spreading is decoded by the decode circuit 1512, the decoded result being notified to the CPU 221.

The code group recognition part 15 has a circuit configuration of sixteen inverse spreading units, because the time is shortened most effectively by making the inverse spreading in accordance with the number of codes (16 codes) of S-SCH (Secondary-Synchronization Channel).

The scrambling code recognition part 16 has a circuit configuration of eight inverse spreading units, because the time is shortened most effectively by making the inverse spreading in accordance with the number of scrambling codes (8 codes) belonging to one code group.

The predicted scrambling code recognition part 17 has a circuit configuration of fifteen inverse spreading units, because the time is shortened most effectively by making the inverse spreading in accordance with the scrambling code shifted in a unit of slot.

The inverse spreading part 18 needs to possess an inverse spreading unit conforming to the baseband signal for inverse spreading. The circuit configurations of the basic inverse spreading circuits in the code group recognition part 15 and the scrambling code recognition part 16 were disclosed in the patent document 1.

Figure 4A:
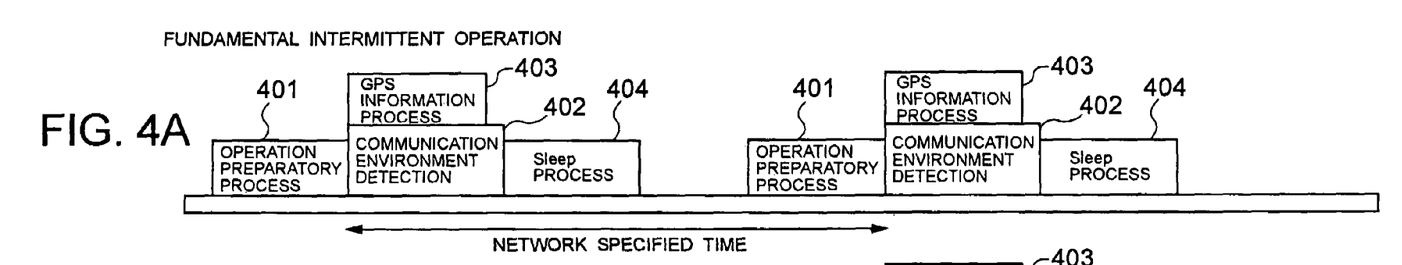
FIG. 4A is a time chart showing an intermittent operation that is fundamental.
Figure 4B:
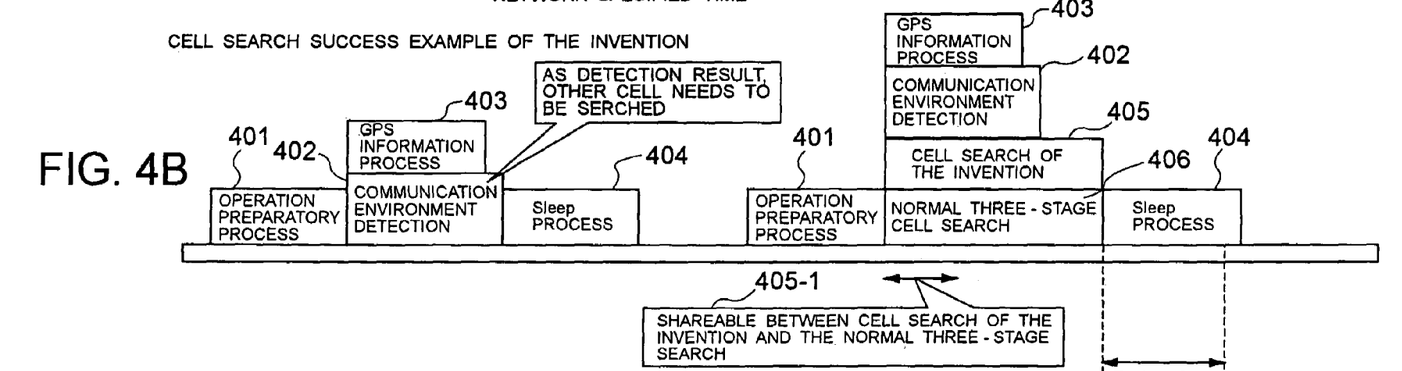
FIG. 4B is a time chart showing the operation of a cell search success example according to one example of the invention.
Figure 4C:
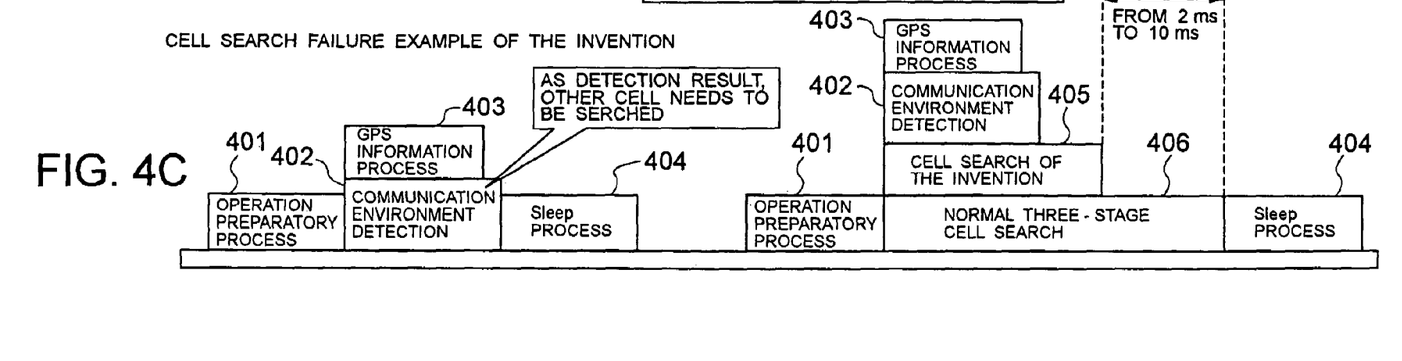
FIG. 4C is a time chart showing the operation of a cell search failure example according to one embodiment of the invention.

FIG. 4 are the time charts showing the operation of a cell search method according to one embodiment of the invention. FIG. 4A shows an intermittent operation that is fundamental, FIG. 4B shows the operation of a cell search success example according to one example of the invention, and FIG. 4C shows the operation of a cell search failure example according to one embodiment of the invention. Referring to FIGS. 1 to 4, the operation of the cell search method according to one embodiment of the invention will be described below.

In the W-CDMA mobile communication system, it is recommended that intermittent reception is performed at a specific time interval that is specified from a network to make efficient power control in a wait state (state of waiting for a call incoming).

Referring to FIG. 4A, the intermittent receiving operation in this embodiment will be described below. First of all, in the intermittent reception that is fundamental, the mobile communication terminal 1 performs an operation preparatory process 401 including required settings (turning on the power to the LSI (Large Scale Integrated circuit)) for receiving electric wave from a cell for which the scrambling code has been already found at the specific time interval.

Thereafter, the mobile communication terminal 1 performs a communication environment detection 402 for measuring the received power from the cell, and at the same time a GPS information process 403 in parallel with the operation of the communication environment detection 402. The mobile communication terminal 1 saves the information processing result in the memory 222, with the current position and the cell information at that time in a pair (set) as the position information database 223. Subsequently, the mobile communication terminal 1 performs a Sleep process 404 for making the setting (turning off the power to the LSI) for suppressing the consumption power.

The mobile communication terminal 1 repeatedly perform the fundamental operation of intermittent reception, unless there is any change in the communication environment, and maintains the wait state while expanding the storage contents of the position information database 223.

When the communication environment is deteriorated by movement of the mobile, communication terminal 1 to cause the necessity of detecting another cell, the inverse spreading part 18 in the mobile communication terminal 1 notifies the result of the communication environment detection 402 to the control part 22. In this case, the CPU 221 saves the result of GPS information process 403 in the memory 222.

The control part 22 performs in parallel the communication environment detection 402, the GPS information process 403, the cell search 405 of the invention, and the normal three-stage cell search 406, when the operation preparatory process 401 is ended at the next receiving period.

A procedure of the cell search 405 of the invention is made in the following way. The mobile communication terminal I makes synchronization establishment of P-SCH, employing the slot synchronization part 14. If the slot synchronization establishment is completed, a slot synchronization timing is notified from the slot synchronization part 14 to the control part 22. This processing operation is performed in common with the normal three-stage cell search 406.

The control part 22 collates the previous result of the GPS information process 403 and the stored content of the position information database 223 and predicts the scrambling code to be searched at the next time.

The CPU 221 of the control part 22 acquires the necessary information for inverse spreading of the predicted scrambling code from the memory 222 and sends it to the inverse spreading code generation part 224.

A received CPICH (Common Pilot Channel) signal is inputted into the predicted scrambling code recognition part 17. The predicted scrambling code recognition part 17 inputs the inverse spreading code shifted in a unit of slot from the inverse spreading code generation part 224 to attempt inverse spreading.

The decode circuit 1512 of the basic inverse spreading circuit in the predicted scrambling code recognition part 17 determines whether or not the prediction from the position information is correct based on the result of inverse spreading, and makes a notification to the CPU 221.

When the prediction is fulfilled, the mobile communication terminal 1 suspends the normal three-stage cell search 406 performed in parallel with the cell search 405 of the invention. When the prediction is false, the mobile communication terminal 1 continues to perform the normal three-stage cell search 406.

As described above, the mobile communication terminal 1 measures the current position, based on the GPS information, and predicts the scrambling code by referring to the past movement histories and the cell information at that time, when it is required to search the new cell because the received power is decreased due to movement of the mobile communication terminal 1. The mobile communication terminal 1 makes the inverse spreading with the predicted scrambling code, and ends the cell search if the correct prediction is detected.

In this way, since the inverse spreading is made with the predicted scrambling code, based on the current position from the GPS information in this embodiment, the time for recognizing the scrambling code is shortened.

Figure 5:
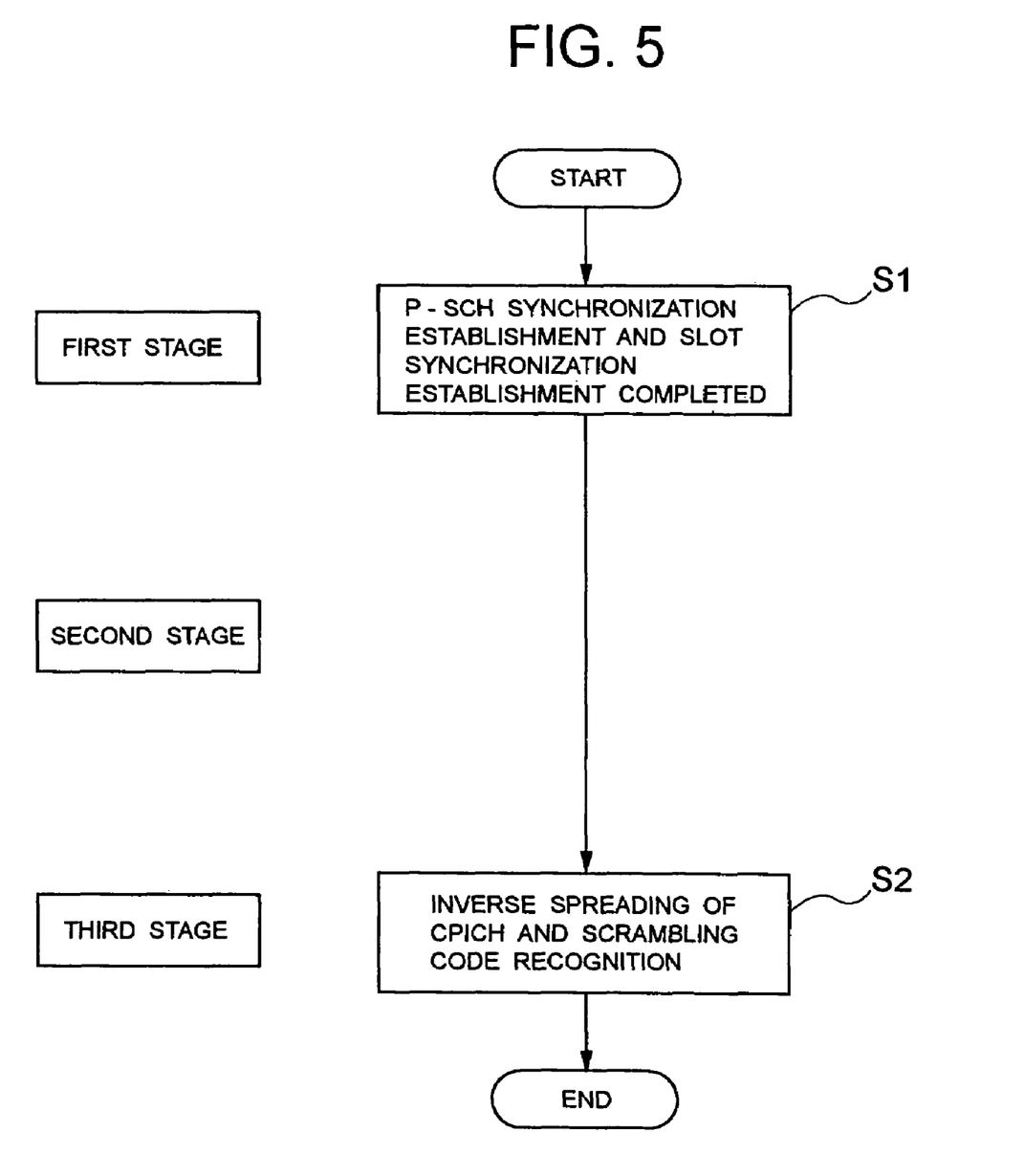
FIG. 5 is a flowchart showing a cell search operation according to one embodiment of the invention.

That is, in, this embodiment, the synchronization establishment of P-SCH and the slot synchronization establishment at the first stage are performed (step S1 in FIG. 5), the synchronization establishment of S-SCH and the frame synchronization establishment at the second stage are not performed, unlike the second stage of the conventional example, and the inverse spreading of CPICH and the scrambling code recognition at the third stage are performed (step S2 in FIG. 5), as shown in FIG. 5. Therefore, the time for recognizing the scrambling code is shortened because the second stage is not performed.

In this invention, if the GPS information is receivable even in the environment (outer) where the signal of W-CDMA communication system is unreceivable, the cell search 405 of the invention is performed, employing the GPS information, after transferring to the environment (inner) where the signal of W-CDMA communication system is receivable, whereby the time for recognizing the scrambling code is shortened.

Also, the configuration of each of the above-mentioned slot synchronization part 14, the code group recognition part 15, the scrambling code recognition part 16, the predicted scrambling code recognition part 17, and the inverse spreading part 18 is fundamentally similar, and shared, whereby the processes (communication environment detection 402, GPS information process 403, cell search 405 of the invention, normal three-stage cell search 406) are performed not in parallel, but sequentially to suppress the consumption power. If there is any merit such as reduction in circuit scale, the processes may be appropriately combined, but not in parallel.

Moreover, it is unnecessary to measure the receiving frequency of the GPS information at every time of intermittent reception, whereby the measurement operation may be made at every appropriate number of times. Only when there is a report that it is required to search other cell in the communication environment detection 402, the cell search 405 of the invention may be performed at the next time of intermittent reception.

Moreover, in this invention, when the detected movement speed is slow, the reception frequency of GPS information may be measured at every appropriate number of times, and only when there is a report that it is required to search other cell in the communication environment detection 402, the cell search 405 of the invention may be performed at the next time of intermittent reception.

What is claimed is:

1. A mobile communication system comprising:
    a plurality of cells, each assigned a unique scrambling code; and
    a mobile communication terminal configured for detecting which cell among said plurality of cells said mobile communication terminal belongs to,
    wherein said mobile communication terminal includes an inverse spreading unit and a control part, said control part predicting the unique scrambling code, based on an acquired current position and a past movement history of the mobile communication terminal, and a communication environment detection for each of said plurality of cells, said control part determining whether or not said predicted unique scrambling code is correct based upon the result of said inverse spreading unit, said inverse spreading unit being configured for inverse spreading the predicted unique scrambling code, said inverse spreading unit shifting an inputted inverse spreading code one unit slot.

2. The mobile communication system according to claim 1, wherein said mobile communication terminal further comprises a database that collates the acquired current position and the previously acquired position and said control part predicts the next unique scrambling code from said database.

3. The mobile communication system according to claim 1, wherein said mobile communication terminal is further configured for performing a cell detection process of three stages, comprising:
    a first stage of establishing a slot synchronization;
    a second stage of establishing a frame synchronization; and
    a third stage of scrambling code recognition in parallel with a cell detection process using said predicted unique scrambling code.

4. The mobile communication system according to claim 3, wherein said mobile communication terminal suspends said cell detection process of three stages, when said predicted scrambling code is determined to be correct.

5. A mobile communication terminal comprising:
    means for detecting which cell among a plurality of cells said mobile terminal belongs to, based on a unique scrambling code assigned to each of said plurality of cells;
    means for acquiring communication environment information and past movement history for the mobile communication terminal;
    means for acquiring the current position information of the mobile communication terminal;
    means for predicting the scrambling code, based on the acquired current position information, the past movement history, and the communication environment information;
    means for inverse spreading the predicted scrambling code and for shifting an inputted inverse spreading code unit one slot;
    means for determining whether or not said predicted scrambling code is correct based upon said inverse spreading of the predicted scrambling code; and
    means for employing the scrambling code that is determined to be correct.

6. The mobile communication terminal according to claim 5, wherein said mobile communication terminal further comprises a database that collates the acquired current position and previously acquired position, and said means for predicting the scrambling code is based upon the result of said inverse spreading of the predicted scrambling code.

7. The mobile communication terminal according to claim 6, wherein said mobile communication terminal is further configured for performing a cell detection process of three stages, comprising:
    a first stage of establishing a slot synchronization;
    a second stage of establishing a frame synchronization; and
    a third stage of establishing a scrambling code recognition in parallel with a cell detection process using said predicted scrambling code.

8. The mobile communication terminal according to claim 7, wherein said mobile communication terminal suspends said cell detection process of three stages, when said predicted scrambling code is determined to be correct.

9. A cell search method for use with a mobile communication system comprising a mobile communication terminal configured for detecting which cell among a plurality of cells said mobile communication terminal belongs to, based on a scrambling code assigned to each cell, said method comprising:
    a step of acquiring communication environment information and a past movement history for the mobile communication terminal;
    a step of acquiring the current position information of the mobile communication terminal;
    a step of predicting the scrambling code, based on the acquired current position information, the past movement history, and the communication environment information; and
    a step of determining whether or not said predicted scrambling code is correct based upon the result of an inverse spreading unit configured for inverse spreading the predicted scrambling code, said inverse spreading unit shifting an inputted inverse spreading code one unit slot; and employing the scrambling code that is determined to be correct.

10. The cell search method according to claim 9, wherein said mobile communication terminal further comprises a database that collates the acquired current position and the previously acquired position, and said step of predicting the scrambling code comprises reading the information of said cell from said database, based on said acquired current position information, and predicts said scrambling code, based on the information of said cell.

11. The cell search method according to claim 9, wherein said mobile communication terminal is further configured for performing a cell detection process of three stages, comprising:
   a first stage of establishing a slot synchronization;
   a second stage of establishing a frame synchronization;
   a third stage of establishing scrambling code recognition in parallel with a cell detection process using said predicted scrambling code.

12. The cell search method according to claim 11, wherein said mobile communication terminal suspends said cell detection process of three stages, when said predicted scrambling code is determined to be correct.

13. A computer readable, storage medium having computer readable program executable on a computer for searching a plurality of cells in a mobile communication system, said program enables the computer to perform the steps of:
   detecting by a mobile communication terminal which cell among said plurality of cells said mobile communication terminal belongs to, based on a unique scrambling code assigned to each of said plurality of cells, wherein said detecting step includes sub-steps of:
      acquiring communication environment information and a past movement history for the mobile communication terminal;
      acquiring the current position information of the mobile communication terminal;
      predicting the unique scrambling core, based on the acquired current position information, the past movement history, and the communication environment information;
      determining whether or not said predicted unique scrambling code is correct based upon the result of an inverse spreading unit configured for inverse spreading the predicted unique scrambling code, said inverse spreading unit shifting an inputted inverse spreading code one unit slot; and
   employing the unique scrambling code that is determined to be correct.

* * * * *